United States Patent
Wingenter (10) Patent No.: US 7,702,436 B2
(45) Date of Patent: Apr. 20, 2010

(54) SYSTEM AND METHOD OF TROUBLESHOOTING AIRCRAFT SYSTEM FAILURES

(75) Inventor: Ronald Wingenter, San Antonio, TX (US)

(73) Assignee: Standard Aero (San Antonio), Inc., San Antonio, TX (US)

( * ) Notice: Subject to any disclaimer, the term of this patent is extended or adjusted under 35 U.S.C. 154(b) by 754 days.

(21) Appl. No.: 11/541,241

(22) Filed: Sep. 29, 2006

(65) Prior Publication Data

US 2008/0082229 A1    Apr. 3, 2008

(51) Int. Cl.
G01M 17/00 (2006.01)
G06F 19/00 (2006.01)

(52) U.S. Cl. .................. 701/29; 702/182; 702/184; 702/185

(58) Field of Classification Search .......... 701/29, 701/36; 702/182–183; 700/174–175
See application file for complete search history.

(56) References Cited

U.S. PATENT DOCUMENTS

| | | | |
|---|---|---|---|
| 6,505,145 B1 * | 1/2003 | Bjornson | ............ 702/185 |
| 6,574,537 B2 | 6/2003 | Kipersztok et al. | |
| 6,810,383 B1 | 10/2004 | Loveland | |
| 6,859,781 B1 | 2/2005 | Gloor et al. | |
| 6,968,293 B2 * | 11/2005 | Wiegand | ............ 702/184 |
| 7,065,433 B2 * | 6/2006 | Basu et al. | ............ 701/29 |
| 2001/0041999 A1 | 11/2001 | Young et al. | |
| 2002/0007237 A1 | 1/2002 | Phung et al. | |
| 2002/0091500 A1 | 7/2002 | Sakaguchi | |
| 2002/0165791 A1 | 11/2002 | Segawa et al. | |
| 2002/0188494 A1 | 12/2002 | Budnik et al. | |
| 2003/0167117 A1 | 9/2003 | Sangeeta et al. | |
| 2004/0111197 A1 | 6/2004 | Kipersztok et al. | |
| 2004/0199307 A1 | 10/2004 | Kipersztok et al. | |
| 2004/0254794 A1 | 12/2004 | Padula | |
| 2007/0050310 A1 | 3/2007 | Wingenter | |
| 2008/0172268 A1 | 7/2008 | Wingenter | |

OTHER PUBLICATIONS

Pending U.S. Appl. No. 11/490,363, filed Jul. 20, 2006.
PCT/US2005/046452, publication of international search report Apr. 30, 2009.
PCT/US2005/046452, Written Opinion of the International Search Authority mailed Jun. 17, 2008.
PCT/US2005/046452, International Preliminary Report on Patentability Chapter I issued Mar. 10, 2009.

* cited by examiner

*Primary Examiner*—Yonel Beaulieu
(74) *Attorney, Agent, or Firm*—Quarles & Brady LLP (57) ABSTRACT

A method of determining a preferred order of implementing maintenance tasks and determining a plurality of maintenance tasks related to a received maintenance request is disclosed. A first expected cost of implementing the plurality of maintenance tasks in a first order and a second expected cost of implementing the plurality of maintenance tasks in a second order are determined. An implementation order for the plurality of maintenance tasks is selected based at least in part on the first and second expected costs. Expected costs may be determined based at least in part on the cost of implementing each maintenance task and based on the probability that the problem has not yet been addressed by preceding tasks.

19 Claims, 7 Drawing Sheets

| Task | Description | P(fix) | Time (min) | Cost |
|---|---|---|---|---|
| 1 | Check for FOD | 0.04 | 10 | $22.50 |
| 2 | Clean compressor | 0.05 | 45 | $86.25 |
| 3 | Check starter air supply | 0.06 | 15 | $18.75 |
| 4 | Check and TD valve null orifice adjustment | 0.09 | 15 | $58.00 |
| 5 | Check propeller blade angle | 0.07 | 10 | $17.50 |
| 6 | Check TD valve is in Put position | 0.12 | 90 | $2,250.00 |
| 7 | Check for torching during start | 0.05 | 20 | $25.00 |
| 8 | Remove two nozzles and check screens | 0.13 | 90 | $1,012.00 |
| 9 | Check operation of bleed valves | 0.08 | 15 | $118.75 |
| 10 | Check inlet temp compensation bellows adjustment | 0.06 | 35 | $87.00 |
| 11 | Change fuel control | 0.25 | 240 | $2,500.00 |

*FIG. 6*

| Order # | Order of Tasks | Expected Cost (USD) |
|---|---|---|
| 802 | 5-3-7-1-4-10-9-2-8-11-6 | $ 2,004 |
| 804 | 1-2-3-4-5-6-7-8-9-10-11 | $ 2,976 |
| 806 | 11-8-6-4-9-5-3-10-2-7-1 | $ 4,775 |
| 808 | 1-5-3-4-9-7-10-2-6-8-11 | $ 2,444 |
| 810 | 5-3-1-7-4-2-10-9-8-6-11 | $ 2,268 |
| 812 | 6-11-8-2-9-10-4-1-7-3-5 | $ 5,248 |

FIG. 7

| Order # | Order of Tasks | Expected Cost (minutes) |
|---|---|---|
| 902 | 5-4-9-1-3-7-10-8-6-2-11 | 250 |
| 804 | 1-2-3-4-5-6-7-8-9-10-11 | 284 |
| 806 | 11-8-6-4-9-5-3-10-2-7-1 | 400 |
| 808 | 1-5-3-4-9-7-10-2-6-8-11 | 255 |
| 810 | 5-3-1-7-4-2-10-9-8-6-11 | 261 |
| 912 | 11-2-6-8-10-7-1-3-9-4-5 | 427 |

FIG. 8

SYSTEM AND METHOD OF TROUBLESHOOTING AIRCRAFT SYSTEM FAILURES

FIELD OF THE DISCLOSURE

The present disclosure generally relates to systems and methods of troubleshooting aircraft system and aircraft component failures.

BACKGROUND

Modern mechanical systems include many complex modules that are difficult to repair and otherwise maintain. Various types of mechanical systems, including engines, process control systems, and the like, include many discrete components that can be difficult to evaluate and repair. These complexities are particularly applicable to aircraft engines, such as those on modern commercial and military aircraft. Costs associated with repairs and other maintenance of engines in a fleet of these aircraft can be high. Nonetheless, failure to maintain engines may lead to loss of life and loss of expensive aircraft.

In order to mitigate repair costs and downtime of aircraft in a fleet, airlines and military personnel have begun to utilize statistical reliability analysis techniques to plan and to budget for maintenance of equipment, to predict costs associated with product warranties, and to make decisions about maintenance of a particular device. Nonetheless, these estimations typically do not allow fleet maintenance personnel to implement maintenance or troubleshooting tasks in an order that minimizes maintenance costs. Hence, there is a need for an improved system and method of troubleshooting aircraft system failures.

DETAILED DESCRIPTION OF THE DRAWINGS

In a particular illustrative embodiment a method troubleshooting aircraft system failures includes receiving a maintenance request and determining a plurality of maintenance tasks related to the maintenance request. A first expected cost of implementing the plurality of maintenance tasks in a first order may be determined. A second expected cost of implementing the plurality of maintenance tasks in a second order may also be determined. An implementation order for the plurality of maintenance tasks may be selected based at least in part on the first and second expected costs.

In another illustrative embodiment a method includes identifying a plurality of tasks to address a problem. A cost of implementing each task of the plurality of tasks may be determined. A probability that each task of the plurality of tasks will address the problem may also be determined. A first proposed order of implementing the plurality of tasks may be determined. A first expected cost of addressing the problem as a function of the cost of implementing each task and the probability that the problem has not yet been addressed by preceding tasks in the first proposed order may be determined.

In another illustrative embodiment, a troubleshooting work scope for a system may include a plurality of maintenance tasks sorted in a preferred order of implementation. The preferred order of implementation may reduce an expected cost of troubleshooting the system as a function of an expected cost of implementing each maintenance task and a probability that each maintenance task will be successful.

Figure 1:
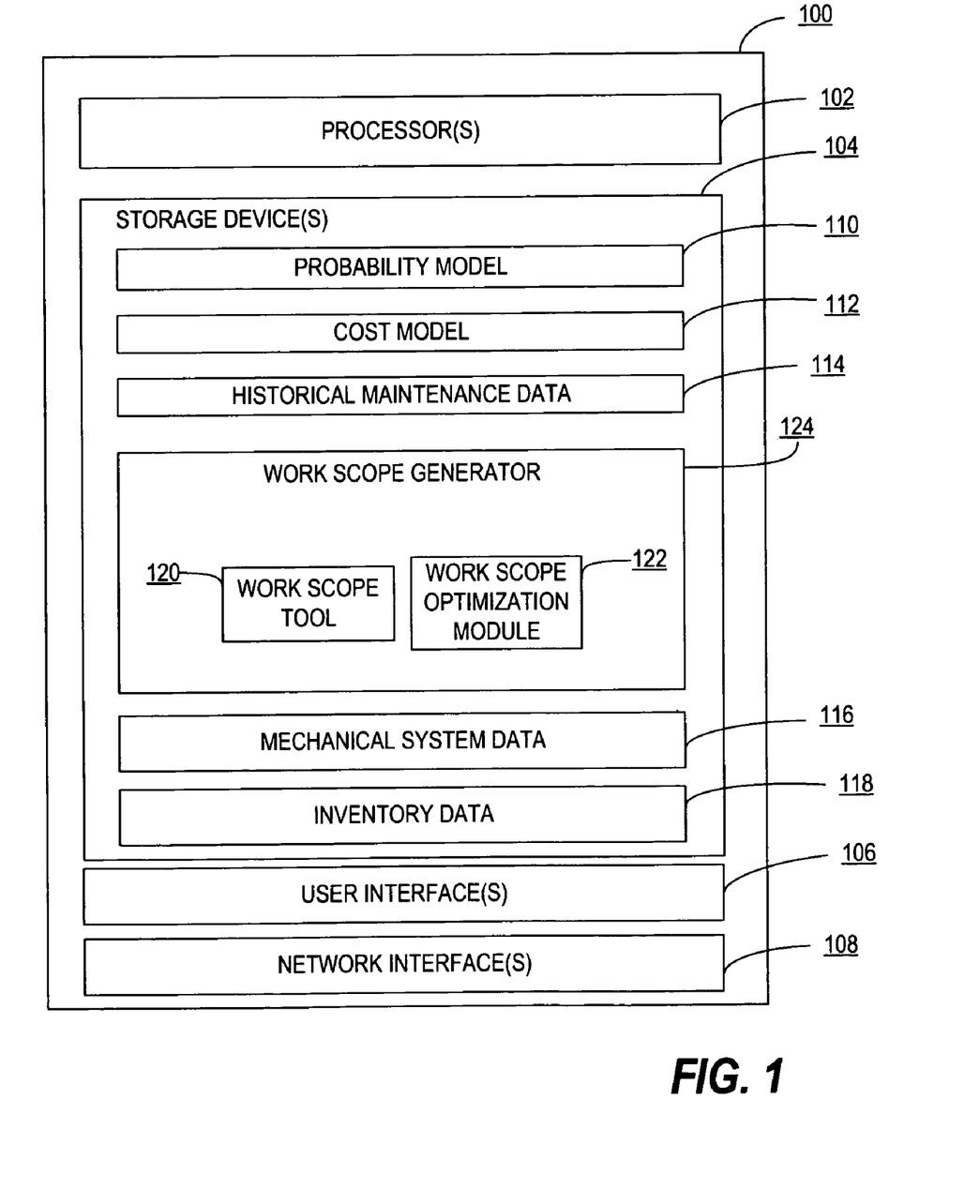
FIG. 1 is a block diagram of a particular illustrative embodiment of a system to troubleshoot mechanical system failures.

Referring to FIG. 1, a block diagram of a particular illustrative embodiment of a system 100 to troubleshoot mechanical system failures is disclosed. While the system 100 is shown as a single integrated unit, it may be implemented such that one or more of its components reside in separate computing or other electronic devices. The system 100 may include a processor 102 and one or more storage devices 104 accessible to the processor 102. Further, the system 100 can include one or more user interfaces 106 and one or more network interfaces 108. In a particular embodiment, the system 100 can include a single storage device 104. In another particular embodiment, the system 100 can include multiple storage devices having various stored elements distributed among the storage devices. In an illustrative embodiment, the storage device 104 can include a hard disk drive, floppy drive, CD-ROM, CD-R, CD-RW, DVD, RAM, flash memory, or any combination thereof. The storage device 104 may also include storage area networks and other types of distributed memories.

In a particular embodiment, the storage device 104 can be configured to store software and computer-implemented instructions. The storage device 104 can provide instructions and data to the processor 102 to select a work scope, including one or more maintenance tasks, associated with a maintenance request for a mechanical system, to model costs associated with the work scope, to select a preferred implementation order of the maintenance tasks, and so forth. For example, the storage device 104 can include a probability model module 110 executable by the processor 102 to estimate the probability that a maintenance task will resolve a problem with the mechanical system. In an illustrative embodiment, the probability model module 110 can model the probability that the maintenance task will resolve the problem based on, for example, manufacturer's test data relating to reliability of various components over time, historical maintenance data 114, or other data. The historical maintenance data may, for example, relate to occurrence or resolution of specific problems.

In a particular embodiment, the storage device 104 can include a cost model module 112 executable by the processor 102 to model the cost of troubleshooting or repairing an aircraft engine or other mechanical system, one or more particular components of an aircraft engine or other mechanical system, or any combination thereof. In an illustrative embodiment, the cost model module 112 can include data related to costs associated with repair and other maintenance tasks, such as costs of various replacement parts, labor related costs, costs associated with being out of service, and so forth. In a particular illustrative embodiment, the cost model module 112 may utilize historical maintenance data 114, derived from information about historical performance of similar maintenance tasks, to estimate costs. The historical maintenance data 114 may also include data related to the amount of time required to implement one or more maintenance tasks.

In a particular embodiment, the storage device 104 can include a work scope generator 124 executable by the processor 102 to recommend one or more work scopes to troubleshoot, repair or otherwise maintain an aircraft engine, other mechanical system, or one or more engine or system components; to evaluate one or more work scopes, to selected a preferred order of maintenance tasks in a work scope; or any combination thereof.

In a particular embodiment, the work scope generator 124 can include a work scope tool 120. The work scope tool 120 may be executable by the processor 102 to generate one or more maintenance tasks to troubleshoot or repair an aircraft or other mechanical system, to repair a failed engine or system component, to perform another maintenance task, or any combination thereof.

In a particular embodiment, the work scope generator 124 can include a work scope optimization module 122 that is executable by the processor 102 to determine a preferred order of implementing one or more maintenance tasks. For example, the work scope optimization module 122 may evaluate a plurality of different orders of implementing a plurality of identified maintenance tasks to identify a preferred order. The preferred order may be an order that reduces expected costs of implementing the one or more maintenance tasks or reduces expected time of implementing the one or more maintenance tasks. For example, the preferred order may be the order with the lowest expected cost, the shortest expected time, or some combination thereof, such as, but not limited to, the lowest expected cost under a threshold time, the shortest implementation time below a threshold cost, or a minimum expected time or expected cost restricted by some other limitation.

The system 100 can include mechanical system data 116, such as data associated with current performance of the mechanical system, data identifying symptoms of the mechanical system, data associated with a history of various parts within the mechanical system, and the like. Further, the system 100 can include inventory data 118 such as a list of available shop assets, parts, components and modules for use in the mechanical system. The system 100 may also include information related to the mechanical system data 116 to determine maintenance tasks to add to the work scope, and may utilize the inventory data 118 to estimate costs, such as the cost of obtaining a component, lost opportunity cost in terms of the time the mechanical system is out of service, and so forth.

The user interfaces 106 may include a software interface, such as a graphical user interface for human interaction. Additionally, the user interfaces 106 may include an input interface for coupling to an input device, such as a touch screen, a keyboard, a mouse, a pen device, and the like. The user interfaces 106 may also include a display interface, such as a monitor. A user may utilize the user interfaces 106 to input data associated with the mechanical system for storage in the mechanical system data 116 of the storage devices 104, to input or review inventory date 118, to input or review cost or probability data, to review a work scope, and so forth.

The network interfaces 108 may be operable by the processor 102 to access remote computer systems via a communications network, such as a wireless network, a wired communications networks, or both wired and wireless networks. Such communications networks may include Ethernet networks and networks conforming to Wi-Fi, Bluetooth®, and Wi-Max standards, for example. In one particular embodiment, the network interfaces 108 may be used to acquire additional data or model parameters associated with a specific mechanical system, or to communicate results to remote systems.

In an illustrative embodiment, the system 100 can provide a user interface to receive a maintenance request. The processor 102 can access the probability model module 110, the cost model module 112, the historical maintenance data 114, the mechanical system data 116, the inventory data 118, or any combination thereof, to determine a plurality of maintenance tasks related to the maintenance request. The work scope optimization module 122 can generate an estimated cost and estimated time to implement each maintenance task. Further, the work scope optimization module 122 can determine a preferred order of implementing the maintenance tasks based on the cost of implementing each maintenance task and the probability that each maintenance task will repair the mechanical system.

Figure 2:
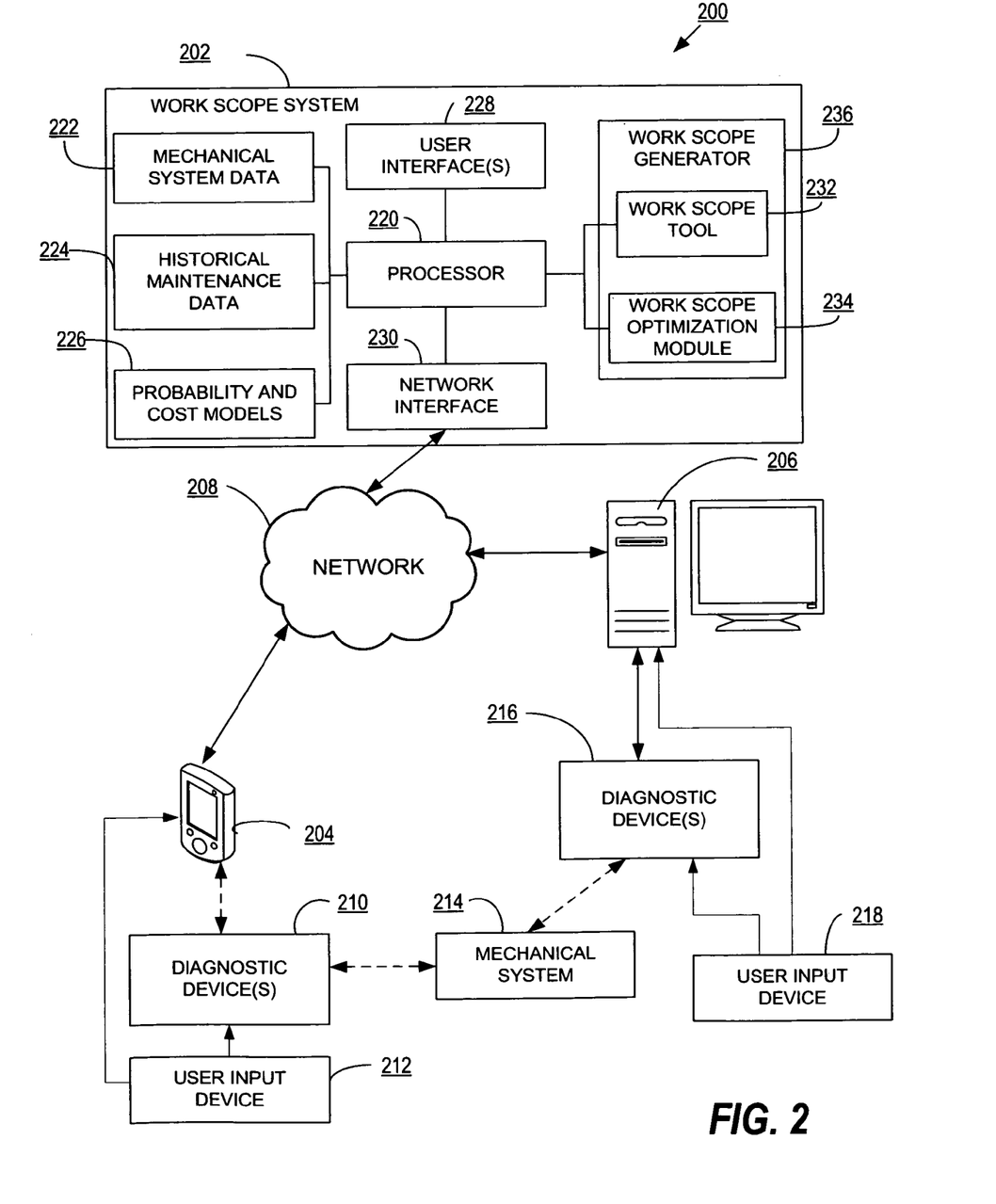
FIG. 2 is a block diagram of a second particular illustrative embodiment of a system to troubleshoot an aircraft system.

FIG. 2 is a block diagram of a particular illustrative embodiment of a system 200 to troubleshoot an aircraft system, such as an aircraft engine. The system 200 can include a work scope system 202, a handheld device 204 and a computing system 206 that are communicatively coupled via a network 208. The handheld device 204 may be coupled to one or more diagnostic devices 210 and to a user input device 212 to receive inputs related to repairs or other maintenance required by a mechanical system 214, such as an aircraft engine or another type of mechanical system. The computing system 206 can be coupled to one or more diagnostic devices 216 and to a user input device 218 to receive inputs related to repairs or other maintenance required by the mechanical system 214.

The work scope system 202 includes a processor 220 and data accessible to the processor 220, such as mechanical system data 222, historical maintenance data 224, probability and cost models 226, and so forth. The work scope system 202 can also include a network interface 230 adapted to communicatively couple the work scope system 202 to the network 208. Additionally, the work scope system 202 can include a work scope generator 236, a work scope tool 232, a work scope optimization module 234, and one or more user interfaces 228.

In an illustrative, non-limiting embodiment, the work scope system 202 can receive diagnostic information associated with the mechanical system 214 from the network 208 via the network interface 230, from the one or more user interfaces 228, or from any combination thereof. For example, diagnostic information associated with the mechanical system 214 can be input by a user via user-input device 212 to the handheld device 204, which transmits the information to the work scope system 202 via the network 208. In a particular embodiment, a diagnostic device 210 may be coupled to the mechanical system 214 to derive performance information and other data from the mechanical system 214 and to provide the information to the handheld device 204.

In an alternative embodiment, the computing system 206 may receive diagnostic information related to the mechanical system 214 from the user-input device 218, from one or more diagnostic devices 216 coupled to the mechanical system 214, or any combination thereof. The computing system 206 may transmit the diagnostic information into the work scope system 202 via the network 208.

In a particular embodiment, the work scope system 202 can process diagnostic information to generate one or more work scopes, each including one or more maintenance tasks, related to the mechanical system 214. For instance, the processor 220 can access the work scope generator 236, mechanical system data 222, the historical maintenance data 224, the probability and cost models 226, or any combination thereof, to generate one or more work scopes associated with troubleshooting, repair or other maintenance of the mechanical system 214. Further, the processor 220 can access the work scope generator 236, mechanical system data 222, the historical maintenance system data 224, the probability and cost models 226, or any combination thereof, to determine a preferred order of implementing the maintenance tasks of a work scope. In an illustrative embodiment, the preferred order of implementing the maintenance tasks can be determined based on the cost of implementing each maintenance task and the probability that each maintenance task will identify or correct a problem with the mechanical system.

Figure 3:
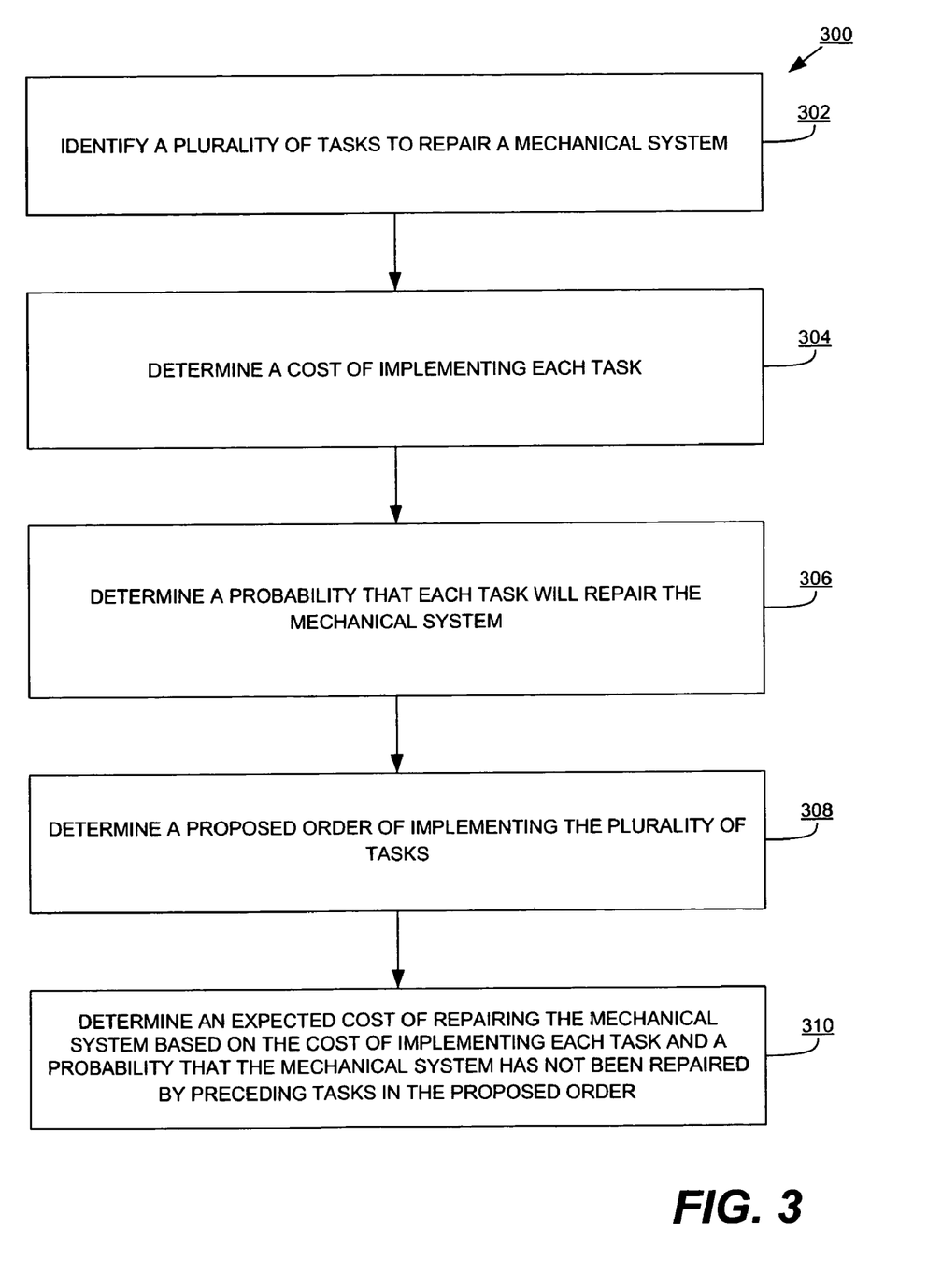
FIG. 3 is a flow diagram of a particular illustrative embodiment of a method of determining an expected cost of troubleshooting a mechanical system.

FIG. 3 is a flow diagram of a particular illustrative embodiment of a method 300 of determining an expected cost of troubleshooting a mechanical system. The method 300 includes identifying 302 a plurality of tasks to repair the mechanical system. For example, the mechanical system may be an aircraft, aircraft engine, or aircraft component.

The method 300 also includes determining 304 a cost of implementing each task of the plurality of tasks, and determining 306 a probability that each task of the plurality of tasks will troubleshoot the mechanical system. That is, determining the probability that each task will identify, diagnose or repair a problem with the mechanical system. The method 300 also includes determining 308 a proposed order of implementing the plurality of tasks. An expected cost of repairing the mechanical system is determined 310. The expected cost is determined based on the cost of implementing each task and a probability that the mechanical system has not been repaired by preceding tasks in the proposed order. The probability that the mechanical system has not been repaired by preceding tasks is based on the probability that each task of the plurality of tasks will repair the mechanical system.

Figure 4:
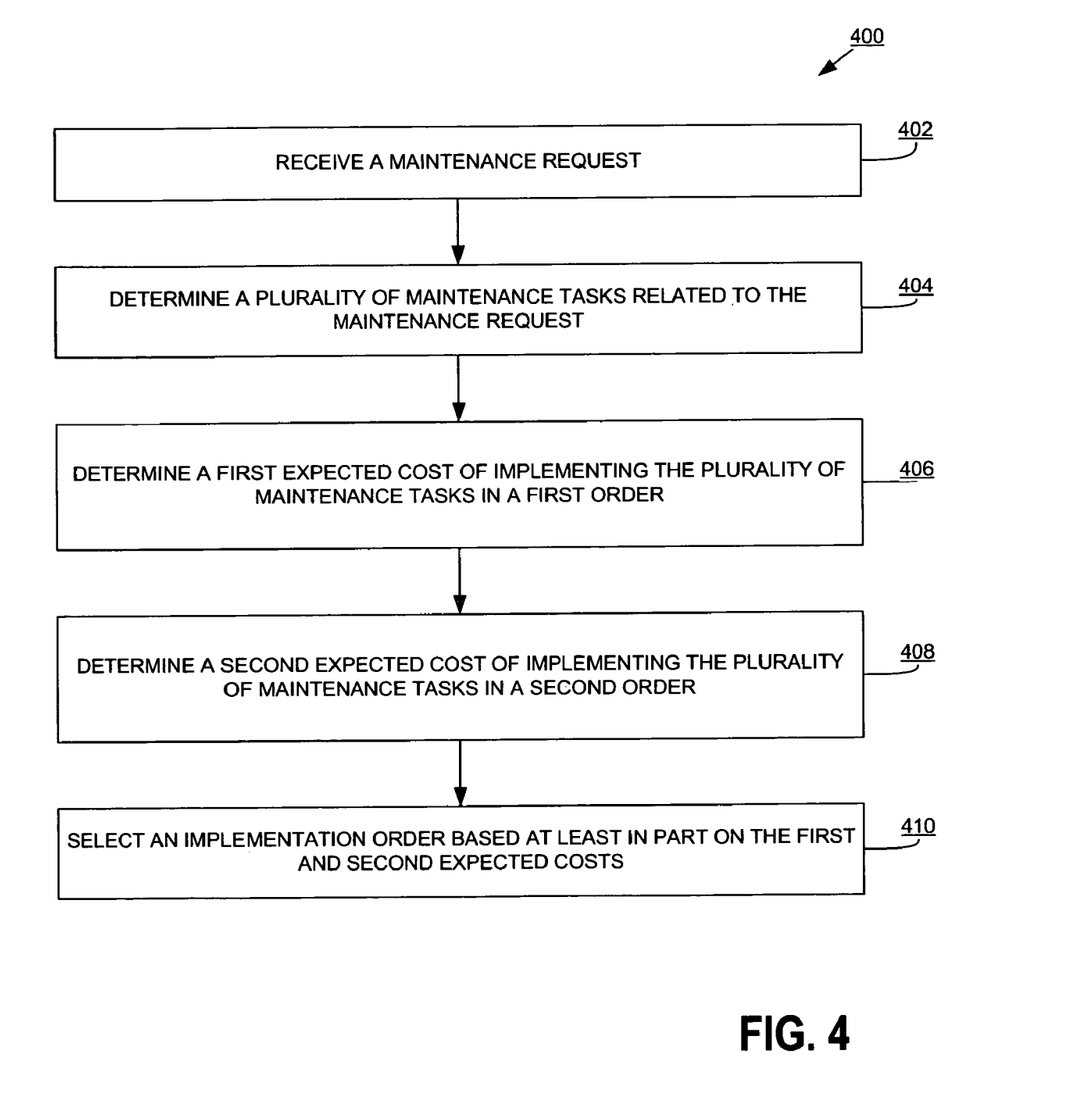
FIG. 4 is a flow diagram of a particular illustrative embodiment of a method of selecting an implementation order of a plurality of maintenance tasks.

FIG. 4 is a flow diagram of a particular illustrative embodiment of a method 400 of selecting an implementation order of a plurality of maintenance tasks. The method 400 includes receiving 402 a maintenance request. A plurality of maintenance tasks related to the maintenance request is determined 404. A first expected cost of implementing the plurality of maintenance tasks in a first order is determined 406. Additionally, a second expected cost of implementing the plurality of maintenance tasks in a second order is determined 408. The method 400 also includes selecting 410 an implementation order for the plurality of maintenance tasks based at least in part on the first and second expected costs.

Figure 5:
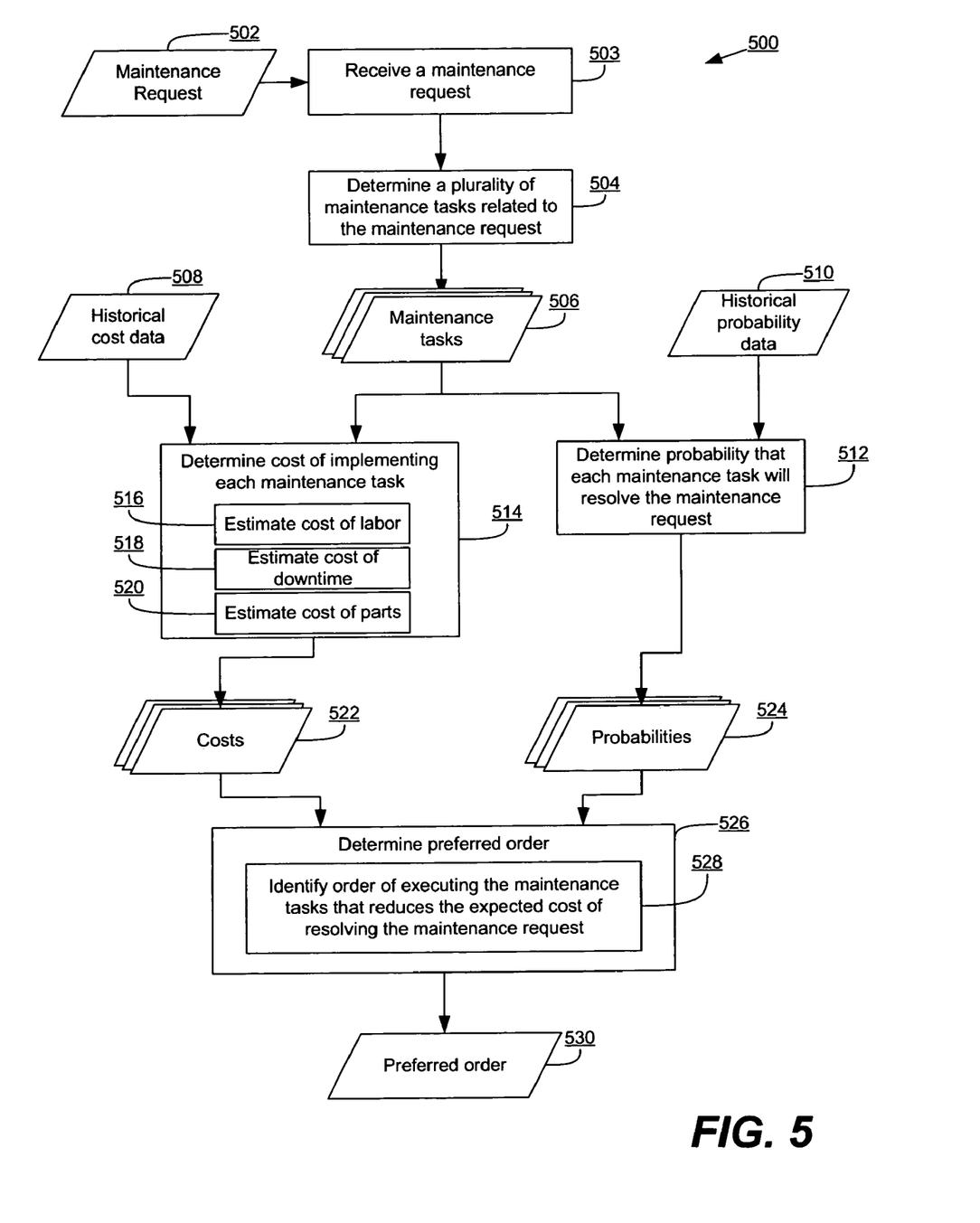
FIG. 5 is a flow diagram of a second particular illustrative embodiment of a method of selecting an implementation order of a plurality of maintenance tasks.

FIG. 5 is a flow diagram of a second particular illustrative embodiment of a method 500 of selecting an implementation order of a plurality of maintenance tasks. The method 500 includes receiving 503 a maintenance request 502. For example, a maintenance request 502 may include a request to troubleshoot a mechanical system, such as, for example, an aircraft engine. The maintenance request 502 may include a description of symptoms experienced by the mechanical system.

The method 500 also includes determining 504 a plurality of maintenance tasks 506 related to the maintenance request 502. The plurality of maintenance tasks 506 may be determined based on historical maintenance data, technical manuals, industry best practices, experience of maintenance personnel, or a combination of these and other sources. In a particular illustrative embodiment, at least a portion of the plurality of maintenance tasks may be determined using computerized system that relates information in the maintenance request 502 to maintenance tasks that may be used to troubleshoot a mechanical system.

The method 500 also includes determining 514 a cost of implementing each maintenance task. The cost 522 of implementing each maintenance task may include factors such as, cost of labor 516, cost of downtime 518, cost of parts 520, or combinations of these and other factors. The costs 522 may be actual values or estimates. In a particular illustrative embodiment, costs may be determined based at least in part on historical cost data 508.

The method 500 also includes determining 512 a probability 524 that each maintenance task will resolve the maintenance request. In a particular illustrative embodiment, the probability that each maintenance task will resolve the maintenance request may be determined based at least in part on historical probability data 510. Historical probability data 510 may include information such as how frequently a particular type of problem identified in the maintenance request was resolved or diagnosed by a particular maintenance task.

The method 500 also includes determining 526 a preferred order of implementing the maintenance tasks. In a particular illustrative embodiment, determining 526 a preferred order 530 of implementing the maintenance tasks includes identifying 528 an order of executing the maintenance tasks that reduces the expected cost of resolving the maintenance request relative to other possible orders of implementing the maintenance tasks. For example, the method may include determining a first expected cost of implementing the plurality of maintenance tasks in a first order and determining a second expected cost of implementing the plurality of maintenance tasks in a second order. In this example, determining the preferred order 530 may include selecting an implementation order of maintenance tasks based at least in part on the first and second expected costs. For example, the preferred order 530 may be the order with the lower expected cost overall cost, the order with the lower expected downtime cost (e.g., the order with the shortest expected implementation time), the order with the lower expected cost of labor, and so forth.

In another example, determining 526 the preferred order 530 may include determining an expected cost of implementing the plurality of maintenance tasks in each possible order. In such an example the preferred order 530 may be the order with the lowest expected overall cost, the order with the lowest expected downtime cost (e.g., the order with the shortest expected implementation time), the order with the lowest expected cost of labor, and so forth.

In a particular illustrative embodiment, the preferred order 530 may be an order that meets multiple criteria. For example, the preferred order may be the lowest cost order with an expected implementation time lower than a threshold implementation time. Likewise, the preferred order may be the order with the shortest expected implementation time that has an expected cost below a threshold cost value.

In a particular illustrative embodiment, determining the preferred order includes determining an expected cost of implementing the plurality of maintenance tasks in a particular order. The expected costs may be determined at least in part based on the cost 522 of implementing each task in the plurality of maintenance tasks and a probability 524 that each task will be successful. For example, the expected cost of implementing a plurality of maintenance tasks in a particular order may be determined using Equation 1.

$$C = \sum_{m=1}^{m=n} c_m \left(1 - \sum_{i=0}^{i=m-1} p_i\right)$$ (Equation 1)

where C is the expected cost of implementing the maintenance tasks in the specified order,
where $c_m$ is the cost of implementing task m,
where $p_i$ is the probability that task i will address the problem,
where task i=m−1, which is one task prior to task m, and
where $p_0$ is equal to zero.

Figure 6:
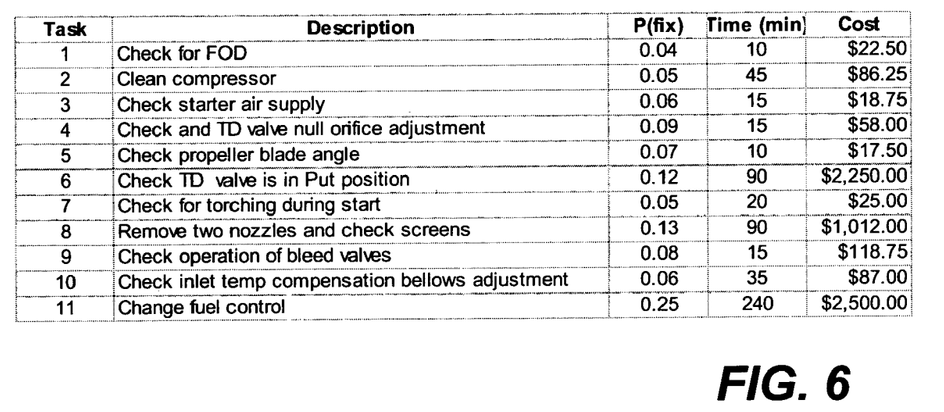
FIG. 6 is a table depicting an exemplary list of maintenance tasks identified to resolve a particular maintenance request.

FIG. 6 is a table depicting an exemplary list of maintenance tasks identified to resolve a particular maintenance request. The maintenance tasks are not listed in the table in any meaningful order or sequence.

The expected cost of implementing the tasks listed in FIG. 6 in the order that they are listed may be determined using Equation 1 as follows:

$C = \$22.50 + \$86.25\ (1 - 0.04) +$ $\$18.75\ (1 - (0.04 + 0.05)) + \$58.00\ (1 - (0.04 + 0.05 + 0.06)) +$ $\$17.50\ (1 - (0.04 + 0.05 + 0.06 + 0.09)) +$ $\$2250.00\ (1 - (0.04 + 0.05 + 0.06 + 0.09 + 0.07)) +$ $\$25.00\ (1 - (0.04 + 0.05 + 0.06 + 0.09 + 0.07 + 0.12)) + 1012.00$ $(1 - (0.04 + 0.05 + 0.06 + 0.09 + 0.07 + 0.12 + 0.05)) + \$118.75 +$ $(1 - (0.04 + 0.05 + 0.06 + 0.09 + 0.07 + 0.12 + 0.05 + 0.13)) + \$87.00$ $(1 - (0.04 + 0.05 + 0.06 + 0.09 + 0.07 + 0.12 + 0.05 + 0.13 + 0.08)) +$ $\$2500.00\ (1 - (0.04 + 0.05 + 0.06 + 0.09 +$ $0.07 + 0.12 + 0.05 + 0.13 + 0.08 + 0.06))$

Thus, the expected cost, C, for implementing the tasks in the order they are presented in FIG. 6 is approximately $2,976.

Figure 7:
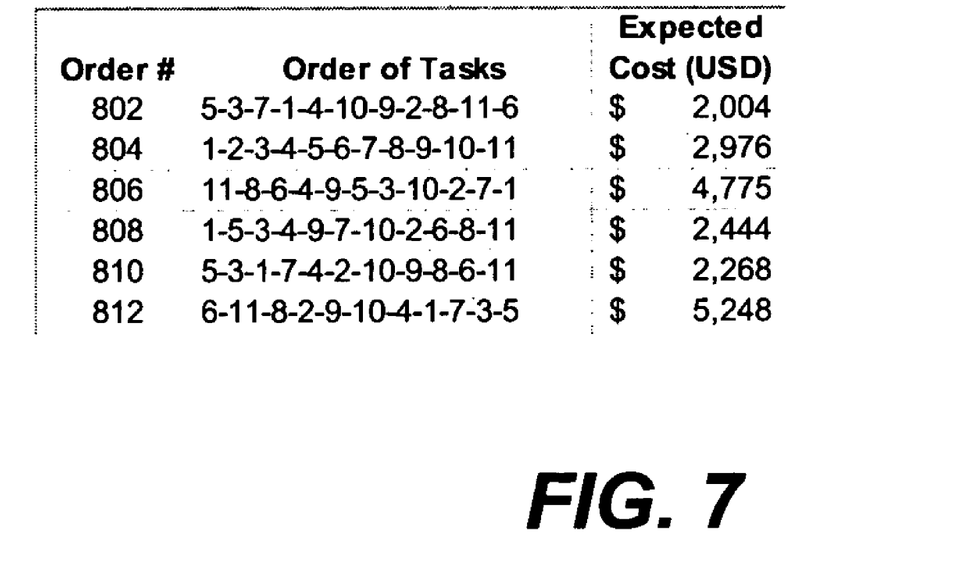
FIG. 7 is a table depicting expected monetary cost of implementing the maintenance tasks listed in the table of FIG. 6.
Figure 8:
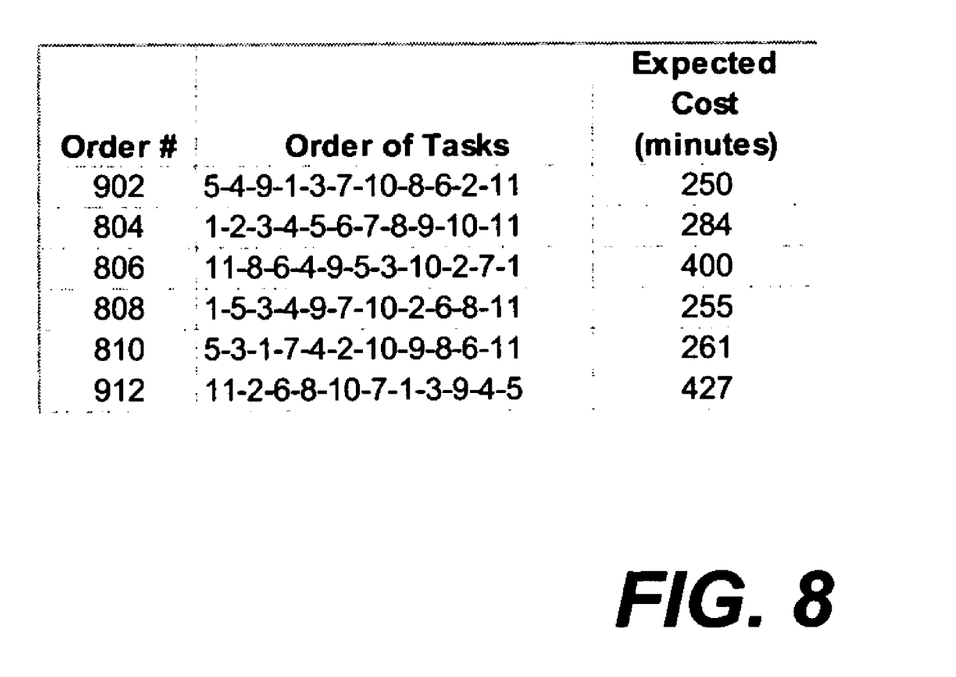
FIG. 8 is a table depicting expected time cost of implementing the maintenance tasks listed in the table of FIG. 6.

FIGS. 7 and 8 are tables depicting expected monetary costs and time cost, respectively, of implementing the eleven maintenance tasks listed in the table of FIG. 6 in various orders. In FIGS. 7 and 8, each implementation order is assigned a reference number in the "Order #" column. The "Order of Tasks" column identifies the order in which the eleven maintenance tasks identified in FIG. 6 are implemented. The "Expected Cost" column shows the expected cost of implementing the maintenance tasks in the specified order based on the expected cost equation shown above as Equation 1. The "Expected Cost" column of FIG. 7 identifies the expected monetary cost of implementing the maintenance tasks rounded to the nearest dollar. The "Expected Cost" column of FIG. 8 identifies the expected time cost of implementing the maintenance tasks, i.e., the expected amount of time required to implement the maintenance tasks.

Referring to FIG. 7, several potential orders of implementing the maintenance tasks have been included in the table to illustrate certain advantages of methods disclosed herein. For example, order 804 is the order in which the maintenance tasks were listed in FIG. 6. Thus, if maintenance personnel simply implemented the tasks in the order they were specified in this list, the expected cost would be $2,976. This is in contrast to order 802, which represents the lowest cost order based on Equation 1. Order 802 has an expected cost of $2,004.

Other potential orders of implementing the maintenance tasks include order 806, in which the maintenance tasks are implemented in order of likelihood that each task with address the problem. That is, in order 806, the maintenance tasks are sorted from the highest probability to the lowest probability. Note that the expected cost of implementing the maintenance tasks in probability order 806 is $4775.

Another potential order of implementing the maintenance tasks is order 808, in which the maintenance tasks are implemented in order of the amount of time required to implement each task. That is, in order 808, the maintenance tasks are sorted from the shortest required implementation time, to the longest required implementation time. Order 808 has an expected cost of implementing the maintenance steps of $2444.

Still another potential order of implementing the maintenance tasks is order 810, in which the maintenance tasks are implemented in order of the cost required to implement each task. That is, in order 810, the maintenance tasks are sorted from the cheapest to the most expensive. Order 810 has an expected cost of implementing the maintenance steps of $2268.

Thus, the preferred order 802, with an expected implementation cost of $2004 results in a substantial savings in expected cost compared to any of these potential implementation orders. Additionally, the preferred order 802 results in a very substantial savings as compared to order 812, which is the implementation order with the highest expected cost.

Referring to FIG. 8, several potential orders of implementing the maintenance tasks have been included in the table. Orders 804, 806, 808 and 810 are the same orders as previously discussed with reference to FIG. 7; however, in FIG. 8 the expected cost for each is calculated in terms of expected time required to implement the maintenance tasks. For example, implementing the maintenance tasks in order 804, the order in which the tasks were originally listed in FIG. 6, it is expected to require 284 minutes to address the problem. Likewise, implementing the maintenance tasks in order of decreasing probability as in order 806, it is expected to require 400 minutes to address the problem. Implementing the maintenance tasks in order of increasing time required as in order 808, it is expected to require 255 minutes to address the problem. Implementing the maintenance tasks in order of decreasing monetary cost as in order 810, it is expected to require 261 minutes to address the problem.

Thus, the preferred order 902, with an expected implementation time of 250 minutes, results in a savings in the expected amount of time required to implement the maintenance tasks as compared to any of these potential implementation orders. Additionally, the preferred order 902 results in a substantial time savings as compared to order 912, which is the implementation order with the highest expected implementation time.

In a particular embodiment, the steps of the methods described herein can be executed in the order shown by the figures. In alternative embodiments, some steps can be executed simultaneously or in alternative sequences. Additionally, in accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Further-more, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification may describe components and functions that may be implemented in particular embodiments with reference to particular standards and protocols, the invention is not limited to such standards and protocols. For example, standards for packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments and are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments that fall within the true spirit and scope of the present invention. This disclosure is intended to cover any and all subsequent adaptations or variations of various embodiments. Combinations of the above embodiments, and other embodiments not specifically described herein, will be apparent to those of skill in the art upon reviewing the description. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    receiving a maintenance request associated with a mechanical system;
    determining a plurality of maintenance tasks related to the maintenance request;
    determining a first expected cost of implementing the plurality of maintenance tasks in a first order;
    determining a second expected cost of implementing the plurality of maintenance tasks in a second order, wherein the second order is different from the first order; and
    automatically selecting an implementation order from the first order and the second order based at least in part on a comparison of the first expected cost and the second expected cost.

2. The method of claim 1, wherein the mechanical system includes an aircraft engine.

3. The method of claim 1, wherein at least one of the first expected cost and the second expected cost is determined based at least in part on historical data.

4. The method of claim 1, wherein the implementation order with a lower expected cost is automatically selected.

5. A method comprising:
    identifying a plurality of tasks to repair a mechanical system;
    determining a cost of implementing each task of the plurality of tasks;
    determining a probability that each task of the plurality of tasks will repair the mechanical system;
    determining a proposed order of implementing the plurality of tasks; and
    determining an expected cost of repairing the mechanical system based on the cost of implementing each task and a probability that the mechanical system has not been repaired by preceding tasks in the proposed order, wherein the probability that the mechanical system has not been repaired by preceding tasks is based on the probability that each task of the plurality of tasks will repair the mechanical system.

6. A maintenance system comprising:
    a work scope generator to determine a plurality of maintenance tasks based at least in part on symptoms of a mechanical system and to determine an implementation order of the plurality of maintenance tasks based on an expected cost of troubleshooting the mechanical system, wherein the implementation order is determined by the work scope generator based at least in part on a probability that each maintenance task of the plurality of maintenance tasks will correct the symptoms of the mechanical system and based at least in part on a cost of implementing each maintenance task of the plurality of maintenance tasks.

7. The maintenance system of claim 6, further comprising a database of maintenance tasks associated with symptoms of the mechanical system.

8. The maintenance system of claim 6, further comprising historical maintenance data accessible to the work scope generator, wherein the probability of each maintenance task resolving the symptoms of the mechanical system is determined at least partially based on the historical maintenance data.

9. The maintenance system of claim 6, further comprising historical maintenance data accessible to the work scope generator, wherein the cost of implementing each task is determined at least partially based on the historical maintenance data.

10. A computer readable medium tangibly embodying a program of instructions to manipulate a computing system to:
    receive a maintenance request associated with a mechanical system;

determine a plurality of maintenance tasks related to the maintenance request;

determine a first expected cost of implementing the plurality of maintenance tasks in a first order;

determine a second expected cost of implementing the plurality of maintenance tasks in a second order, wherein the second order is different from the first order; and automatically select an implementation order from the first order and the second order based at least in part on a comparison of the first expected cost and the second expected cost.

11. A computer readable medium tangibly embodying a program of instructions to manipulate a computing system to:

determine a cost of implementing each task of a plurality of tasks to repair a mechanical system;

determine a probability that each task of the plurality of tasks will repair the mechanical system;

determine a proposed order of implementing the plurality of tasks; and determine an expected cost to repair the mechanical system based on the cost of implementing each task and a probability that the mechanical system has not been repaired by preceding tasks in the proposed order, wherein the probability that the mechanical system has not been repaired by the preceding tasks is based on the probability that each task of the plurality of tasks will repair the mechanical system.

12. The computer readable medium of claim 11, wherein the program of instructions further manipulates the computing system to determine a plurality of proposed orders of implementing the plurality of tasks and to determine the expected cost to repair the mechanical system based on each of the plurality of proposed orders.

13. The computer readable medium of claim 12, wherein the program of instructions further manipulates the computing system to identify one of the plurality of proposed orders with the lowest expected cost to repair the mechanical system.

14. The method of claim 1, further comprising:

determining a first expected time to implement the plurality of maintenance tasks in the first order; and determining a second expected time to implement the plurality of maintenance tasks in the second order, wherein the implementation order is automatically selected based on the comparison of the first expected cost and the second expected cost and based on a comparison of the first expected time to implement the plurality of maintenance tasks in the first order and the second expected time to implement the plurality of maintenance tasks in the second order.

15. The method of claim 14, wherein the implementation order with the lowest expected cost under a threshold time to implement the plurality of maintenance tasks is automatically selected.

16. The method of claim 14, wherein the implementation order with the shortest implementation time below a threshold cost is automatically selected.

17. The method of claim 1, wherein the first expected cost and the second expected cost include at least one of costs associated with the plurality of maintenance tasks, costs associated with one or more replacement parts, and costs associated with the mechanical system being out of service.

18. The method of claim 1, further comprising:

determining a probability that each maintenance task of the plurality of maintenance tasks will repair the mechanical system;

determining a cost of implementing each maintenance task of the plurality of maintenance tasks; and for each maintenance task in the first order, determining an overall probability that one or more maintenance tasks that precede a particular maintenance task in the first order have repaired the mechanical system based on the probability associated with each of the one or more maintenance tasks that precede the particular maintenance task in the first order; and determining an expected cost of implementing the particular maintenance task in the first order based on the overall probability and based on the cost of implementing the particular maintenance task, wherein the first expected cost of implementing the plurality of maintenance tasks in the first order is determined based on the expected cost of implementing each maintenance task in the first order.

19. The method of claim 18, further comprising:

for each maintenance task in the second order, determining an overall probability that one or more maintenance tasks that precede a particular maintenance task in the second order have repaired the mechanical system based on the probability associated with each of the one or more maintenance tasks that precede the particular maintenance task in the second order; and determining an expected cost of implementing the particular maintenance task in the second order based on the overall probability and based on the cost of implementing the particular maintenance task, wherein the second expected cost of implementing the plurality of maintenance tasks in the second order is determined based on the expected cost of implementing each maintenance task in the second order.

* * * * *